(12) United States Patent
Potter et al.

(10) Patent No.: US 8,245,381 B2
(45) Date of Patent: Aug. 21, 2012

(54) METHOD OF PROVIDING FLEXIBLE DUCT HAVING DIFFERENT INSULATIVE VALUES

(75) Inventors: Russell M. Potter, Hebron, OH (US); Ann M. dePaauw, Pickerington, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 391 days.

(21) Appl. No.: 12/627,445

(22) Filed: Nov. 30, 2009

(65) Prior Publication Data

US 2011/0126390 A1 Jun. 2, 2011

(51) Int. Cl.
*B21D 51/00* (2006.01)
*F16L 9/14* (2006.01)

(52) U.S. Cl. .............. 29/458; 29/460; 29/516; 29/517; 138/129; 138/149

(58) Field of Classification Search ............ 29/458, 29/460, 527.2, 516, 517; 138/129, 144, 149
See application file for complete search history.

(56) References Cited

U.S. PATENT DOCUMENTS

| | | | | |
|---|---|---|---|---|
| 1,860,203 A | * | 5/1932 | Rishel | 138/141 |
| 1,895,420 A | | 1/1933 | Mottweller | |
| 2,324,181 A | * | 7/1943 | Tulien | 138/161 |
| 3,030,250 A | * | 4/1962 | Losse | 138/149 |
| 3,189,053 A | * | 6/1965 | Parr | 138/133 |
| 3,216,459 A | * | 11/1965 | Schroeder et al. | 138/139 |
| 3,594,246 A | * | 7/1971 | Arovelius | 56/162 |
| 3,652,377 A | | 3/1972 | Helmick | |
| 3,682,746 A | | 8/1972 | Helmick et al. | |
| 3,817,804 A | | 6/1974 | Helmick et al. | |
| 4,023,589 A | | 5/1977 | Rejeski | |
| 4,104,783 A | | 8/1978 | Schultz | |
| 4,240,850 A | * | 12/1980 | Arntz | 156/78 |
| 4,310,585 A | | 1/1982 | Shannon | |
| 4,590,108 A | | 5/1986 | Nippe | |

(Continued)

FOREIGN PATENT DOCUMENTS

GB 1083399 9/1967

(Continued)

OTHER PUBLICATIONS

International Search Report and Written Opinion from PCT/US10/58322 dated Apr. 18, 2011.

*Primary Examiner* — Jermie Cozart
(74) *Attorney, Agent, or Firm* — Calfee, Halter & Griswold, LLP

(57) ABSTRACT

Methods of providing flexible duct are provided. The methods include the steps of providing an inner core, the inner core having a cylindrical shape and an outer surface, providing a layer of insulation having a constant uncompressed thickness, fiber diameter and density, wrapping the layer of insulation around the outer surface of the inner core thereby forming a layered assembly, selecting an outer jacket from a set of outer jackets of different diameters, the selected outer jacket configured to compress the layer of insulation to a desired thickness and inserting the layered assembly into the selected outer jacket thereby forming flexible duct. The thickness of the compressed layer of insulation provides a desired insulative value. The outer jackets included in the set of outer jackets are configured to compress the layer of insulation into a plurality of flexible duct having different insulative values from each other.

19 Claims, 3 Drawing Sheets

U.S. PATENT DOCUMENTS

| | | | |
|---|---|---|---|
| 4,772,507 A * | 9/1988 | Leo et al. | 428/218 |
| 4,777,086 A | 10/1988 | Madden et al. | |
| 4,780,347 A * | 10/1988 | Cohen | 428/34.2 |
| 4,842,908 A * | 6/1989 | Cohen et al. | 428/34.2 |
| 4,909,282 A * | 3/1990 | Staugaard | 138/149 |
| 4,929,409 A | 5/1990 | Agren et al. | |
| 5,192,039 A * | 3/1993 | Williams | 248/62 |
| 5,607,529 A * | 3/1997 | Adamczyk et al. | 156/143 |
| 5,947,158 A | 9/1999 | Gross et al. | |
| 6,000,420 A * | 12/1999 | Nicholson et al. | 137/15.01 |
| 6,062,270 A * | 5/2000 | Hultberg et al. | 138/129 |
| RE37,279 E * | 7/2001 | Fisher et al. | 138/156 |
| 6,843,279 B1 * | 1/2005 | Ungemah | 138/149 |
| 6,905,566 B1 | 6/2005 | Pitzer et al. | |
| 7,624,762 B2 * | 12/2009 | Cohen et al. | 138/149 |
| 2002/0162599 A1 | 11/2002 | Aubourg | |
| 2004/0163724 A1 | 8/2004 | Trabbold et al. | |

FOREIGN PATENT DOCUMENTS

| | | |
|---|---|---|
| JP | 2005-114018 | 4/2005 |
| WO | 2009/134992 | 11/2009 |
| WO | 2011/066534 | 6/2011 |

\* cited by examiner

METHOD OF PROVIDING FLEXIBLE DUCT HAVING DIFFERENT INSULATIVE VALUES

BACKGROUND

Flexible duct can be used in heating, ventilation and air conditioning systems to convey warmed or cooled air. For purposes of maximizing energy efficiency, the flexible duct can be insulated. Accordingly, flexible insulation (also called flexible duct media) can be used to insulate the flexible duct.

Flexible duct often includes at least one layer of fibrous insulation. The thickness and density of the layer of fibrous insulation are factors in determining the insulative value (R value) of the flexible duct. Layers of fibrous insulation that are thicker provide more insulative value than layers of fibrous insulation that are thinner.

Conventional flexible duct can be manufactured using blankets of fibrous insulation having different thicknesses and densities. It would be advantageous to provide a more efficient method of manufacturing flexible duct. Additionally, in current practice, flexible ducts are manufactured with three different insulative values, each for a wide range of duct diameters. This requires the manufacture, storage, and handling of a great number of different flexible duct media products by both the flexible duct media manufacturers and the flexible duct manufacturers. If the number of different flexible duct media products could be reduced while yet allowing the manufacture of flexible ducts with the current range of insulative value and duct size, this would increase the efficiency with flexible ducts are manufactured and also lead to an overall lowered manufacturing cost. One of the purposes of the present invention to provide just such efficiency and cost improvement.

SUMMARY

In accordance with embodiments of this invention there are provided methods of providing flexible duct. The methods include the steps of providing an inner core, the inner core having a cylindrical shape and an outer surface, providing a layer of insulation having a constant uncompressed thickness, fiber diameter and density, wrapping the layer of insulation around the outer surface of the inner core thereby forming a layered assembly, selecting an outer jacket from a set of outer jackets of different diameters, the selected outer jacket configured to compress the layer of insulation to a desired thickness and inserting the layered assembly into the selected outer jacket thereby forming flexible duct. The thickness of the compressed layer of insulation provides a desired insulative value. The outer jackets included in the set of outer jackets are configured to compress the layer of insulation into a plurality of flexible duct having different insulative values from each other.

In accordance with embodiments of this invention there are also provided methods of providing flexible duct configured for various insulative values. The methods include the steps of providing an inner core, the inner core having a cylindrical shape and an outer surface, providing a first layer of insulation having a constant uncompressed thickness, fiber diameter and density, providing a second layer of insulation having a constant uncompressed thickness and density, wrapping the first and second layers of insulation around the outer surface of the inner core thereby forming a layered assembly, selecting an outer jacket from a set of outer jackets of different diameters, the selected outer jacket configured to compress the layers of insulation to a desired thickness and inserting the layered assembly into the selected outer jacket thereby forming flexible duct. The thickness of the compressed layers of insulation provides a desired insulative value. The outer jackets included in the set of outer jackets are configured to compress the layers of insulation into a plurality of flexible duct having different insulative values from each other.

In accordance with embodiments of this invention there are also provided methods of providing flexible duct. The methods include the steps of wrapping an inner core with a layer of insulation thereby forming a layered assembly, the insulation having an uncompressed thickness fiber diameter and a density, compressing the layered assembly with an outer jacket selected from a set of outer jackets thereby forming flexible duct, the selected outer jacket configured to compress the layer of insulation to a desired thickness, wherein the thickness and density of the compressed layer of insulation provide a desired insulative value. Wherein flexible duct having different insulative values can be obtained using the layer of insulation and different jackets.

Various advantages of this invention will become apparent to those skilled in the art from the following detailed description of the invention, when read in light of the accompanying drawings.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with embodiments of the present invention, improved methods and apparatus for manufacturing flexible duct are provided. The term "flexible", as used herein, is defined to mean capable of being bent. The term "flexible duct", as used herein, is defined to mean any duct, configured for the conveyance of gasses, in which at least a portion is flexible. The term "fibrous insulation", as used herein, is defined to mean any insulation formed from fibrous materials. The terms "insulative value" or "R value", as used herein, is defined to mean a measure of thermal resistance.

The description and figures disclose an improved method of providing flexible duct with at least one fibrous insulation layer that can be configured into different insulative values. Generally, the flexible duct includes an inner core and an outer jacket surrounding at least one layer of fibrous insulation. The at least one layer of fibrous insulation is compressed by the outer jacket until a desired thickness is achieved. The desired thickness and the density of the fibrous insulation layer provide a desired insulative value (also called "R" value). By compressing the layer of fibrous insulation to different thicknesses in this manner, a blanket of fibrous insulation can be configured to provide various flexible duct having different insulative values.

Figure 1:
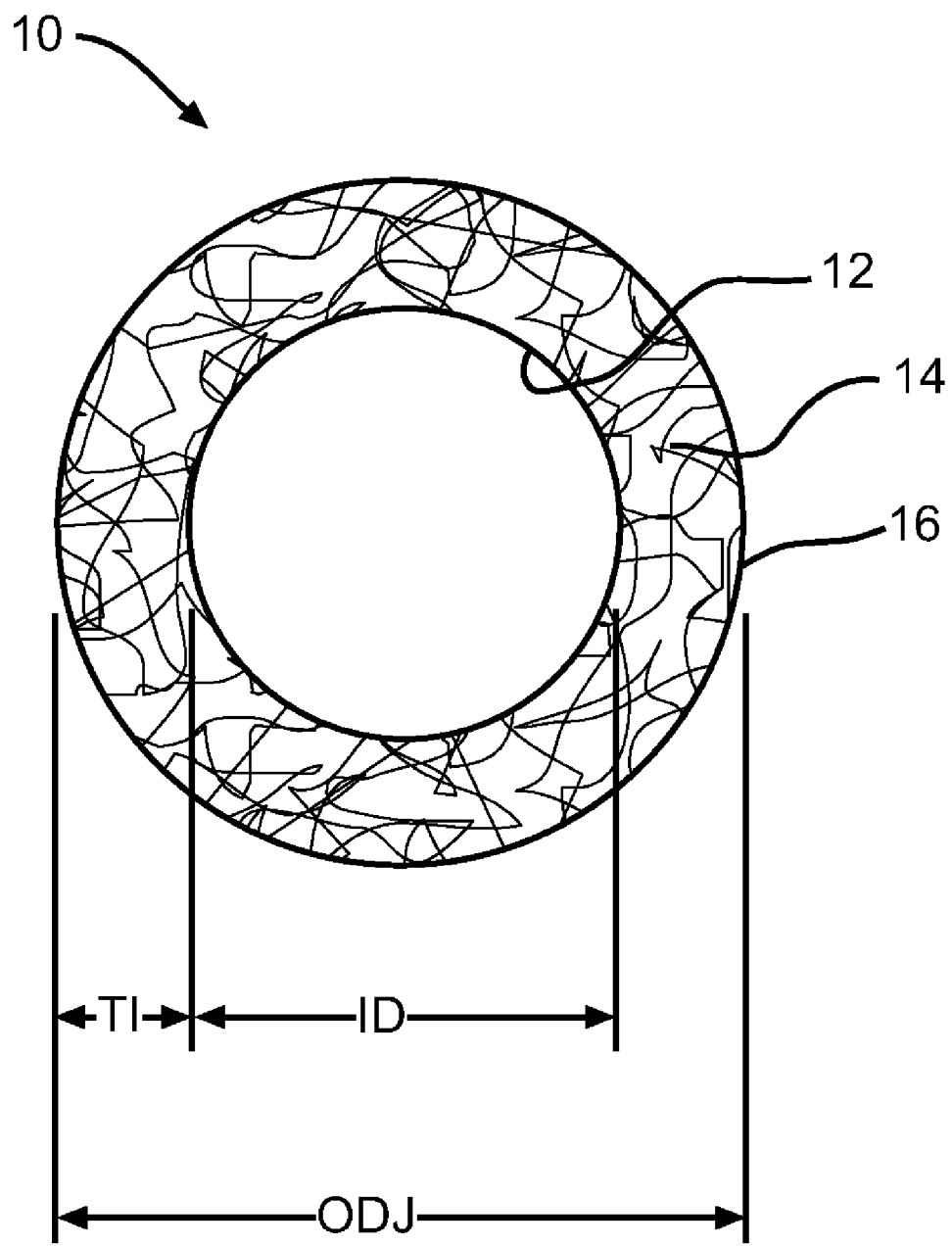
FIG. 1 is a front cross-sectional view of a flexible duct in accordance with the invention.

Referring now to the drawings, a flexible duct is shown generally at 10 in FIG. 1 in accordance with the invention. The flexible duct 10 is configured for use in heating, ventilation and air conditioning systems to convey warmed or cooled air. The flexible duct 10 has an inner diameter ID. The inner diameter ID of the flexible duct 10 can be configured for any desired diameter. In the illustrated embodiment, the inner diameter ID is in a range of from about 3.0 inches to about 24.0 inches. However, the inner diameter ID can be less than about 3.0 inches or more than about 24.0 inches. The flexible duct 10 includes an inner core 12, a layer of fibrous insulation 14 and an outer jacket 16.

Referring again to FIG. 1, the inner core 12 is configured for several functions. First, the inner core 12 is configured to provide a structure having a desired cross-sectional shape. In the illustrated embodiment, the inner core 12 has a circular cross-sectional shape. However, the inner core 12 can have other desired cross-sectional shapes.

Second, the inner core 12 is configured to provide a supporting structure for the layer of fibrous insulation 14 and the outer jacket 16. That is, the inner core 12 is configured to support compression of the layer of fibrous insulation 14 by the outer jacket 16 without changing the cross-sectional shape or inner diameter ID of the inner core 12. In the illustrated embodiment, the inner core 12 includes a structural form (not shown) embedded into a liner. The structural form is a continuous, spirally shaped, wire spring configured such that the individual coils of the wire spring are spaced apart along the length of the liner. However, in other embodiments, the structural form can have other forms sufficient to provide a supporting structure for compression of the layer of fibrous insulation 14 within the outer jacket 16. In still other embodiments, the inner core 12 can be void of structural forms. The wire spring can have any desired cross-sectional shape and any desired diameter.

The liner of the inner core 12 is configured to maintain the structural form in its spaced apart configuration and also configured to provide a surface for the layer of fibrous insulation 14. In the illustrated embodiment, the liner is made from a polymeric material such as the non-limiting example of mylar film. However, the liner can be made of other desired materials. In the illustrated embodiment, the liner has a thickness in a range of from about 0.0005 inches to about 0.0030 inches. In other embodiments, the liner can have a thickness less than about 0.0005 inches or more than about 0.0030 inches. Optionally, the liner can include a desired reinforcing material, such as for example fiberglass.

Referring again to FIG. 1, the layer of fibrous insulation 14 surrounds the inner core 12. The layer of fibrous insulation 14 is configured to provide insulation to the flexible duct. The layer of fibrous insulation can include a binder. In one embodiment, the binder can be a conventional binder, such as for example a urea-form binder. In other embodiments, the binder can be an organic or renewal bio-binder such as the non-limiting examples of sugar or starch.

The layer of fibrous insulation 14 has a thickness TI, a density and fibers within the fibrous insulation having a fiber diameter (not shown). The fiber diameter of the fibers can be characterized by an average and a standard deviation. The combination of the thickness TI and density of the insulation, together with the fiber diameter of the fibers determines the insulative value of the fibrous insulation 14. Without being bound by the theory, it is believed for densities and fiber diameters typically available in commercial flexible duct media, the insulative value increases with: increasing insulation thickness, increases insulation density, and decreasing average fiber diameter and/or fiber diameter standard deviation. The flexible duct 10 of the present invention advantageously provides that for a fixed fiber diameter and layer area weight of the fibrous insulation and use of one or multiple layers, it is possible to achieve a variety of insulative values (R). The variety of insulative values (R) can include three values of current commercial importance, 4.2, 6 and 8. The variety of insulative values for the flexible duct 10 is further illustrated by reference to the following examples.

EXAMPLES

Example 1

Insulative Value with Larger Fiber Diameter

Example 1 illustrates flexible duct having three different insulative values (R) obtained from one or two layers of a fibrous insulation having an density of 0.094 psf and an average fiber diameter of 5.6 um. The insulative values (R) of Example 1 are illustrated below in Table 1.

TABLE 1

| Insulative Value (R) | Number of Layers | Thickness (in) |
|---|---|---|
| 4.2 | 1 | 1.125 |
| 6.0 | 1 | 1.75 |
| 8.0 | 2 | 2.06 |

Example 2

Insulative Value with Smaller Fiber Diameter

Example 2 illustrates flexible duct having an average fiber diameter of 4.6 um can provide the same three insulative values (R) obtained in Example 1, only made from a reduced insulation area weight (0.082 psf) and a reduced thickness. The insulative values (R) of Example 2 are illustrated below in Table 2.

TABLE 2

| Insulative Value (R) | Number of Layers | Thickness (in) |
|---|---|---|
| 4.2 | 1 | 1.06 |
| 6.0 | 1 | 1.75 |
| 8.0 | 2 | 1.94 |

Example 3

Insulative Value with Smaller Fiber Diameter

Example 3 illustrates flexible duct having the combination of a 0.094 psf area weight and an average fiber diameter of 4.6 um can provide the same three insulative values (R) at reduced thickness relative to Examples 1 and 2. Additionally, Example 3 illustrates the insulative value (R) of 8.0 can be made from a single layer of fibrous insulation at a somewhat greater thickness relative to Examples 1 and 2. The insulative values (R) of Example 3 are illustrated below in Table 3.

TABLE 3

| Insulative Value (R) | Number of Layers | Thickness (in) |
|---|---|---|
| 4.2 | 1 | 1.00 |
| 6.0 | 1 | 1.63 |
| 8.0 | 1 | 2.63 |

In this manner, a layer of fibrous insulation, having a given fiber diameter and density, can be compressed to various thicknesses, thereby providing different insulative values to different portions of flexible duct 10. While the examples provided above yield R values of 4.2, 6.0 and 8.0, it should be appreciated that other embodiments of the flexible duct 10 can have other combinations of thickness, fiber diameter and density yielding other desired R values.

The layer of fibrous insulation 14 can be made of any desired fibrous material, such as the non-limiting example of fiberglass. However, other desired fibrous materials can be used including the non-limiting examples of rock wool fibers and polymeric fibers.

Referring again to FIG. 1, the flexible duct 10 includes the outer jacket 16. The outer jacket 16 is configured for several purposes. First, the outer jacket 16 is configured to compress the layer of fibrous insulation 14 to a desired thickness TI. As discussed above, the thickness TI of the fibrous insulation determines the insulative value of the layer of fibrous insulation 14. Second, the outer jacket 16 provides a substantially weather resistant outer layer to the flexible duct 10. In the illustrated embodiment, the outer jacket 16 is made of a polymeric material, such as the non-limiting example of polyester, having a thickness in a range of from about 0.0007 inches to about 0.0014 inches. In other embodiments, the outer jacket 16 can be made from other polymeric materials and can have a thickness of less than about 0.0007 inches or more than about 0.0014 inches.

Optionally, the outer jacket 16 can include other materials or coatings configured for other desired purposes. As one non-limiting example, the outer jacket 16 can include a desired reinforcing material, such as for example fiberglass reinforcing fibers or fiberglass reinforcing mats, configured to provide strength and/or puncture resistance to the flexible duct 10. As another non-limiting example, the outer jacket 16 can include a foil-based coating configured for thermal and light reflective purposes.

While the embodiments of the flexible duct 10 discussed above and illustrated in FIG. 1 are described as having an inner core 12, a layer of fibrous insulation 14 and an outer jacket 16, it should be appreciated that other embodiments of the flexible duct can include additional layers. In some embodiments, the additional layers can include the use of scrim as a separate layer within the flexible duct. The scrim can be made of any desired material, such as for example glass fibers.

Figure 2:
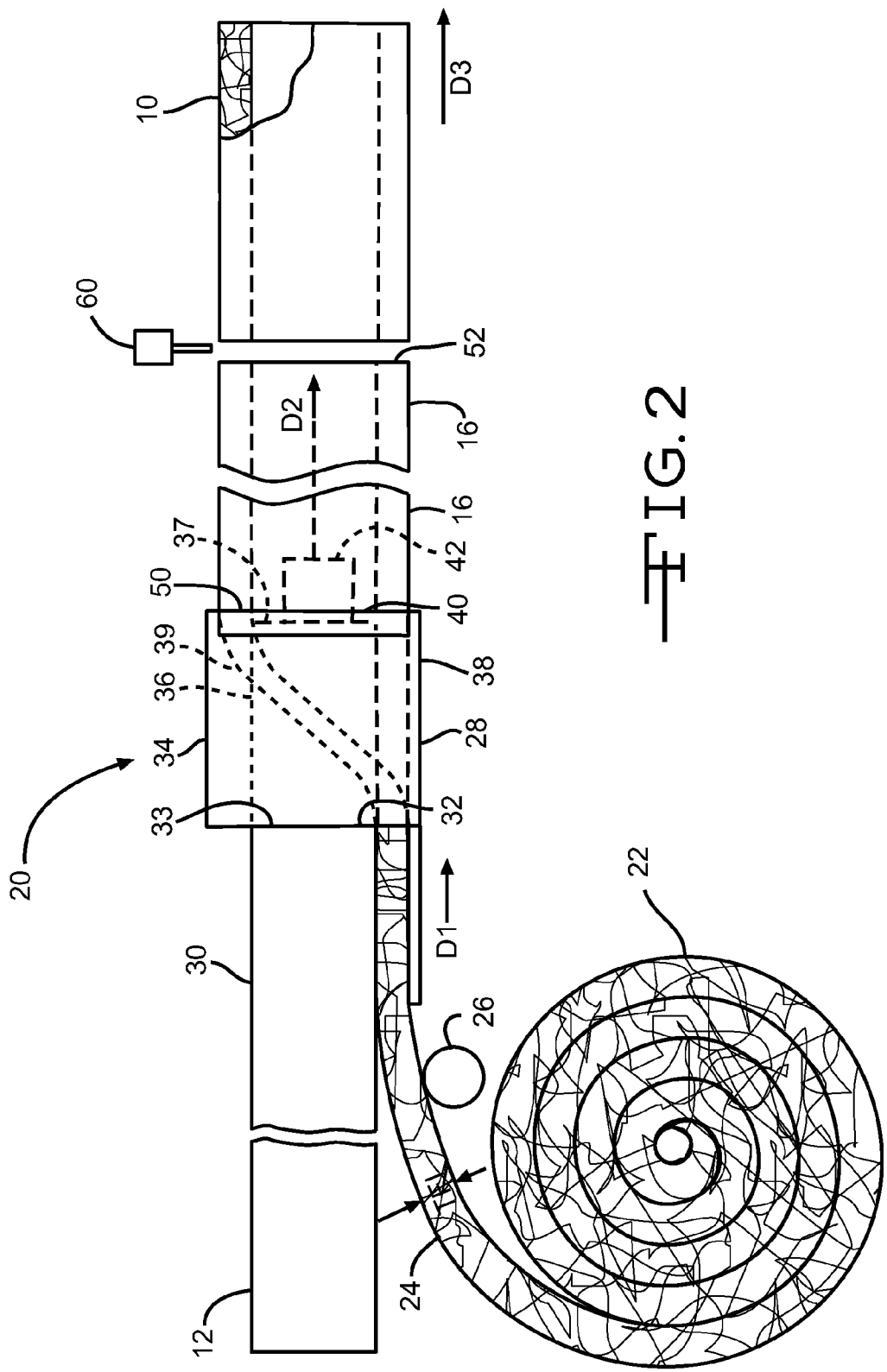
FIG. 2 is a schematic elevational view, partially in cross section, of a portion of an apparatus for making flexible duct according to the method of the invention.

Referring now to FIG. 2 an apparatus 20 for manufacturing flexible duct 10 according to the invention is illustrated. Generally, the illustrated manufacturing process involves wrapping an external surface of a cylindrically-shaped inner core with a layer of fibrous insulation thereby forming a layered assembly and then inserting the layered assembly into an outer jacket such that the outer jacket compresses the layer of fibrous insulation to a desired thickness. The inner core 12, compressed layer of fibrous insulation 14 and the outer jacket 16 combine to form the flexible duct 10.

In a first step of the manufacturing process, a roll 22 of fibrous insulation 24 is provided. In the illustrated embodiment, the roll 22 includes fibrous insulation having a single layer and lengths of one hundred feet. However, the roll 22 can be provided with multiple layers and in other desired lengths. In the illustrated embodiment, the fibrous insulation 24 has a constant, uncompressed minimum thickness TFI of about 2.125 inches. In other embodiments, the fibrous insulation 24 can have a constant, uncompressed minimum thickness TFI less than or greater than about 2.125 inches.

The fibrous insulation 24 is positioned to unroll, advance over guide roller 26 and lay substantially flat on table 28. The guide roller 26 is configured to guide the fibrous insulation 24. The guide roller 26 can be any desired structure, mechanism, device or combination thereof, including the non-limiting examples of a roller or a chute, sufficient to guide the fibrous insulation 24. The table 28 is configured to support the fibrous insulation 24 and the inner core 12 for further downstream manufacturing operations. The table 28 can be any desired structure, mechanism, device or combination thereof, including the non-limiting example of a series of rollers, sufficient to support the fibrous insulation 24 and the inner core 12 for further downstream manufacturing operations.

Next, the inner core 12 is provided. In the illustrated embodiment, the inner core 12 has a previously-formed cylindrical shape and is provided in lengths of 25 feet. In other embodiments, the inner core 12 can have any desired shape and can be provided in lengths greater than or less than 25 feet. The inner core 12 has an outer surface 30. The inner core 12 is advanced in the direction indicated by the arrow D1 toward a forming shoe 34. The inner core 12 can be advanced by any desired structure, mechanism, device or combination thereof, including the non-limiting example of a powered conveyer.

Referring again to FIG. 2, the layer of fibrous insulation 24 and the inner core 12 are joined on the table 28 such that the inner core 12 is positioned on top of the layer of fibrous insulation 24. In this position, a leading edge 32 of the layer of fibrous insulation 24 and a leading edge 33 of the inner core 12 substantially coincide.

The leading edges, 32 and 33, of the layer of fibrous insulation 24 and the inner core 12 advance in direction D1 toward the forming shoe 34.

The forming shoe 34 includes a cylindrically-shaped sloped portion 39, an outer frame 38 and an exit 40. The forming shoe 34 is configured to perform several manufacturing functions. First, as the leading edges, 32 and 33, of the layer of fibrous insulation 24 and the inner core 12 advance in direction D1 into the forming shoe 34, the cylindrically-shaped sloped portion 39 of the forming shoe 34 is configured to wrap the layer of fibrous insulation 24 around the outer surface 30 of the inner core 12 thereby forming a layered assembly 36. The layered assembly 36 is formed such that the inner core 12 and the fibrous layer 24 are concentric, with the fibrous layer 24 being external to the inner core 12. While the illustrated embodiment is described as forming the layered assembly 36 with the forming shoe 34, it should be appreciated that the layered assembly 36 can be formed by other desired structures, mechanisms and devises. The layered assembly 36 has a leading edge 37.

As the leading edge 37 of the layered assembly 36 advances toward the exit 40 of the forming shoe 34, a clamp 42 is attached to the leading edge 37 of the layered assembly 36. The clamp 42 is connected to an actuator (not shown). The actuator is configured to move in the direction indicated by arrow D2 thereby pulling the clamp 42 and the layered assembly 36 in the direction indicated by arrow D3. The clamp 42 can be any desired structure, mechanism or device sufficient to attach to the leading edge 37 of the layered assembly 36 and be pulled by the actuator. The actuator can be any desired structure, mechanism, device or combination thereof, including the non-limiting examples of a hydraulic cylinder, configured to pull the clamp 42 and the layered assembly 36 in the direction D3. In the illustrated embodiment, the actuator pulls the clamp 42 and the layered assembly 36 in direction D3 at a speed in a range of from about 4 feet/second to about 6 feet/second. However, other desired speeds can be used.

Referring again to FIG. 2, a first open end 50 of the outer jacket 16 is positioned over the outer frame 38 of the forming shoe 34 at the exit 40. As the leading edge 37 of the layered assembly 36 leaves the exit 40 of the forming shoe 34, the layered assembly 36 is pulled into the outer jacket 16 such that the leading edge 37 of the layered assembly 36 is pulled to a second open end 52 of the outer jacket 16. In this position, the outer jacket 16 surrounds the layered assembly 36 thereby compressing the fibrous insulation 24 and forming the flexible duct 10. As discussed above, the outer jacket 16 compresses the layered assembly 36 until a desired thickness of the fibrous insulation is achieved. The desired thickness and the density of the fibrous insulative layer result in a desired insulative value (R value). Accordingly, an outer diameter ODJ of the outer jacket 16, as shown in FIG. 1, is selected from a set of outer jackets 16 having differing outer diameters and configured to compress the fibrous insulation layer to a desired thickness. In this manner, section of outer jackets 16 having different outer diameters ODJ provides different compression of the fibrous insulation thereby allowing a layer of fibrous insulation to form a plurality of flexible duct having different insulative values. In the illustrated embodiment, the set of outer jackets 16 includes three jackets. A first of the three jackets 16 is configured to compress the fibrous insulation layer to a thickness providing an insulative value of 4.2 $ft^{2.\circ}$ F.·h/Btu. A second of the three jackets 16 is configured to compress the fibrous insulation layer to a thickness providing a insulative value of 6.0 $ft^{2.\circ}$ F.·h/Btu and a third of the three jackets 16 is configured to compress the fibrous insulation layer to a thickness providing a insulative value of 8.0 $ft^{2.\circ}$ F.·h/Btu. In other embodiments, the set of outer jackets 16 can include more or less than three jackets 16 and the jackets 16 can be configured to compress the fibrous insulation layer to thicknesses providing other desired insulative values.

Referring again to FIG. 2, the flexible duct 10 can be cut to desired lengths by a cutting mechanism 60. The cutting mechanism can be any desired structure, mechanism, device or combination thereof.

Optionally, the flexible duct 10 can be compressed in a lengthwise direction for downstream shipping and handling.

Figure 3:
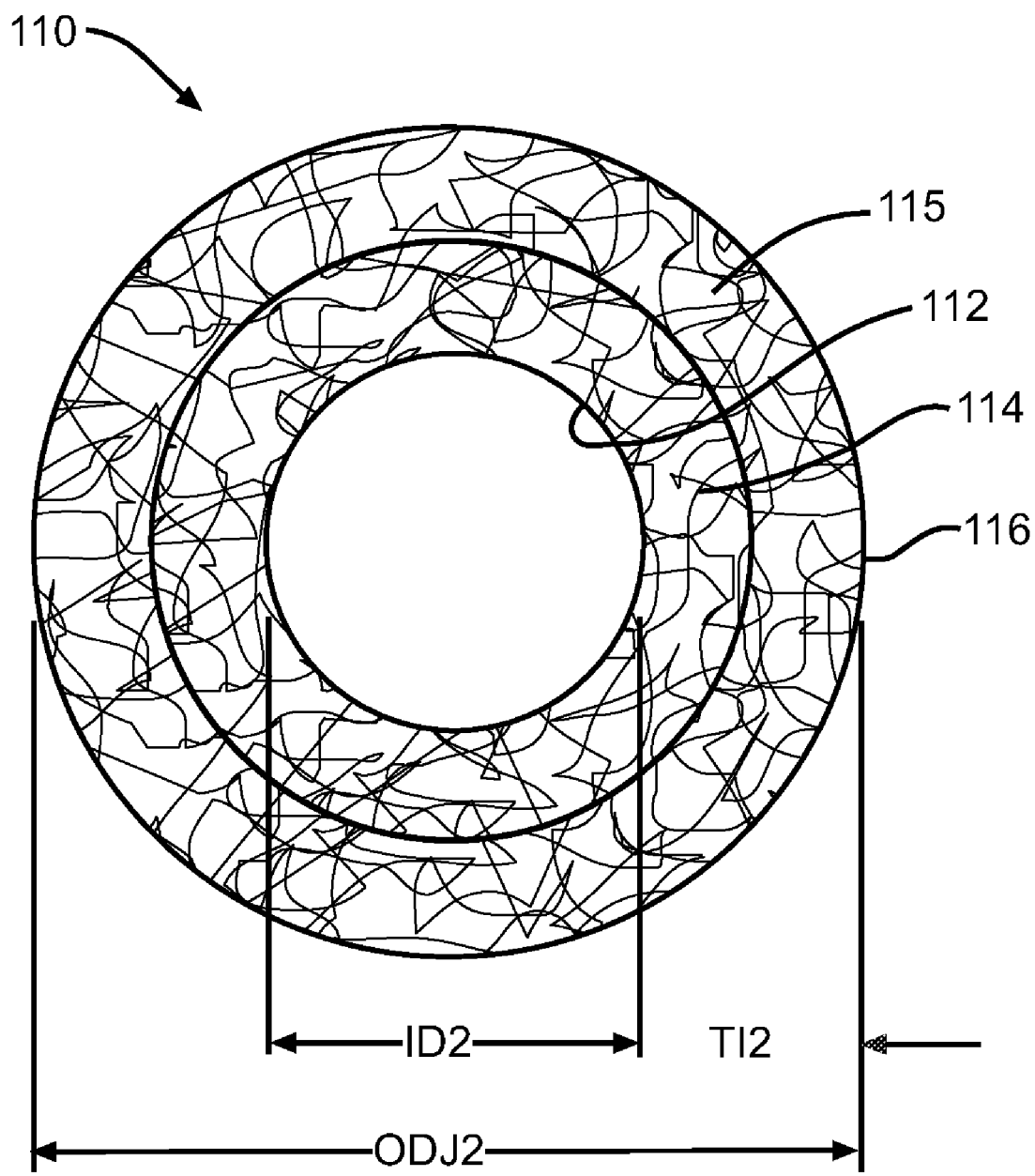
FIG. 3 is a front cross-sectional view of a second embodiment of the flexible duct having more than one layer of compressed fibrous insulation.

While the apparatus and method described in FIG. 2 illustrates the use of a single layer of fibrous insulation to form the flexible duct 10, it should be appreciated that in other manufacturing embodiments, flexible duct can include more than one layer of compressed fibrous insulation. Referring now to FIG. 3, a flexible duct 110 is illustrated as having more than one layer of compressed fibrous insulation.

A flexible duct 110 includes an inner core 112, a first compressed layer of fibrous insulation 114, a second compressed layer of insulation 115 and an outer jacket 116. In the illustrated embodiment, the inner core 112 and the outer jacket 116 are the same as or similar to the inner core 12 and the outer jacket 16 discussed above and shown in FIG. 1.

The flexible duct 110 has an inner diameter ID2, an insulation thickness TI2 and an outer jacket diameter ODJ2. In the illustrated embodiment, the inner diameter ID2, insulation thickness TI2 and outer jacket diameter ODJ2 are the same as or similar to the inner diameter ID, insulation thickness TI and outer jacket diameter ODJ discussed above and shown in FIG. 1.

The first and second compressed layers of insulation, 114 and 115, combine to form the insulation thickness TI2. In the illustrated embodiment, the first and second compressed layers of insulation, 114 and 115, have the same thicknesses and densities. However, in other embodiments, the first and second compressed layers of insulation, 114 and 115, can have different thicknesses and different densities.

The flexible duct 110 can be manufactured with the same or similar apparatus and methods discussed above and shown in FIG. 2, with the exception that a layered assembly is formed from the combination of the inner core 112, the first uncompressed layer of insulation 114 and the second uncompressed layer of insulation 115.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

The principle and mode of operation of this invention have been described in certain embodiments. However, it should be noted that this invention may be practiced otherwise than as specifically illustrated and described without departing from its scope.

What is claimed is:

1. A method of providing flexible duct comprising the steps of: providing an inner core, the inner core having a cylindrical shape and an outer surface; providing a layer of insulation having a fiber diameter, a constant uncompressed thickness, and density; wrapping the layer of insulation around the outer surface of the inner core thereby forming a layered assembly; selecting an outer jacket from a set of outer jackets of different diameters, the selected outer jacket configured to compress the layer of insulation to a desired thickness; and inserting the layered assembly into the selected outer jacket thereby forming flexible duct; wherein the thickness of the compressed layer of insulation provides a desired insulative value; wherein the outer jackets included in the set of outer jackets are configured to compress the layer of insulation into a plurality of flexible duct having different insulative values from each other.

2. The method of claim 1, wherein the inner core includes a structural form and a liner.

3. The method of claim 2, wherein the structural form is a spirally shaped wire spring.

4. The method of claim 2, wherein the liner is made from polymeric film.

5. The method of claim 1, wherein the compressed insulation has a density, fiber diameter and a thickness sufficient to provide the flexible duct with an insulative value of 4.2 $ft^{2.\circ}$ F.·h/Btu.

6. The method of claim 1, wherein the layer of insulation includes an organic binder.

7. The method of claim 1, wherein the selected outer jacket includes a reflective outer coating.

8. The method of claim 1, wherein the layered assembly is formed by a forming shoe.

9. The method of claim 1, wherein the layered assembly is inserted into the outer jacket by a clamp and an actuator.

10. The method of claim 1, wherein the set of outer jackets includes three jackets.

11. The method of claim 10, wherein a first of the three jackets from the set of outer jackets is configured to compress the insulation layer to a thickness providing a insulative value of 4.2 $ft^{2.\circ}$ F.·h/Btu. F·h/Btu, a second of the three jackets is configured to compress the insulation layer to a thickness providing a insulative value of 6.0 $ft^{2.\circ}$ F.·h/Btu and a third of the three jackets is configured to compress the insulation layer to a thickness providing a insulative value of 8.0 $ft^{2.\circ}$ F.·h/Btu.

12. A method of providing flexible duct configured for various insulative values, the method comprising the steps of: providing an inner core, the inner core having a cylindrical shape and an outer surface; providing a first layer of insulation having a fiber diameter, a constant uncompressed thickness, and density; providing a second layer of insulation having a fiber diameter, a constant uncompressed thickness, and density; wrapping the first and second layers of insulation around the outer surface of the inner core thereby forming a layered assembly; selecting an outer jacket from a set of outer jackets of different diameters, the selected outer jacket configured to compress the layers of insulation to a desired thickness; and inserting the layered assembly into the selected outer jacket thereby forming flexible duct; wherein the thickness of the compressed layers of insulation provides a desired insulative value; wherein the outer jackets included in the set of outer jackets are configured to compress the layers of insulation into a plurality of flexible duct having different insulative values from each other.

13. The method of claim 12, wherein the inner core includes a structural form and a liner.

14. The method of claim 12, wherein the structural form is a spirally shaped wire spring.

15. The method of claim 12, wherein the liner is made from polymeric film.

16. The method of claim 12, wherein the compressed insulation has a density, fiber diameter and a thickness sufficient to provide the flexible duct with an insulative value of 4.2 $ft^{2.\circ}$ F.·h/Btu.

17. The method of claim 12, wherein the layered assembly is inserted into the selected outer jacket by a clamp and an actuator.

18. The method of claim 12, wherein the set of outer jackets includes three jackets.

19. The method of claim 18, wherein a first of the three jackets of the set of outer jackets is configured to compress the insulation layer to a thickness providing a insulative value of 4.2 $ft^{2.\circ}$ F.·h/Btu, a second of the three jackets is configured to compress the insulation layer to a thickness providing a insulative value of 6.0 $ft^{2.\circ}$ F.·h/Btu and a third of the three jackets is configured to compress the insulation layer to a thickness providing a insulative value of 8.0 $ft^{2.\circ}$ F.·h/Btu.

* * * * *